Patented Sept. 15, 1936

2,054,453

UNITED STATES PATENT OFFICE 2,054,453

THIAZYL ESTERS OF DITHIOCARBAMIC ACIDS AND PROCESS OF MAKING

Jan Teppema, Cuyahoga Falls, Ohio, assignor to Wingfoot Corporation, Wilmington, Del., a corporation of Delaware No Drawing. Application September 29, 1933, Serial No. 691,509

22 Claims. (Cl. 260—43)

This invention relates to a new and useful class of chemical compounds and to a method of preparing them. More particularly, it concerns a class of materials which may be termed thiazyl esters of N-substituted dithiocarbamic acids. While these compounds may perhaps be prepared by other methods as well, they are preferably formed by reacting a suitable salt of an N-substituted dithiocarbamic acid with a halogen aryl thiazole. While the compounds of the invention may be used for any purpose for which they are suited, it has been found that they are in general good accelerators of vulcanization.

Although any halogen aryl thiazole may be employed, it has been found that the 1-chlor aryl thiazoles are particularly well adapted for the purposes of the invention. Of the 1-chlor aryl thiazoles, 1-chlor 5-nitro benzothiazoles in particular have been found to give products which are excellent accelerators of the vulcanization of rubber. It will, of course, be understood that other 1-chlor aryl thiazoles may be employed in the practice of the invention, typical compounds being 1-chlor 5-methoxy benzothiazole, 1-chlor tolyl thiazole, 1-chlor 4-nitro benzothiazole, 1-chlor-5-ethoxy benzothiazole, 1-chlor-5-methyl bezothiazole, 1-chlor dimethyl benzothiazoles, 1-chlor 4- or 5-chlor benzothiazole, 1-chlor 3-phenyl benzothiazole, 1-chlor naphthothiazales and their nitro derivatives such as 1-chlor 4-chlor 5-nitro benzothiazole and 1-chlor 3-methyl 5-nitro benzothiazole.

The dithiocarbamates used in this process may be represented by the formula

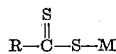

wherein R represents a substituted amino group in which the nitrogen atom of the amine is directly attached to the dithiocarbamyl carbon atom and wherein M is any reactive metallic radical or equivalent group, such as sodium, potassium or ammonium, which does not seriously impair the solubility of the dithiocarbamate in the solvent employed in effecting the desired reaction. The formula representing the dithiocarbamates may also be written

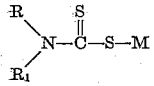

wherein R and R₁ may be similar or dissimilar hydrocarbon or substituted hydrocarbon radicals or R and R₁ taken together may form a pentamethylene ring. Also, either R or R₁, but not both, may represent hydrogen.

The N-substituted dithiocarbamates used in the invention may be prepared according to the known procedure of interacting carbon bisulphide, an alkali and a hydrocarbon-substituted amine. The aliphatic amines, particularly the secondary aliphatic amines, are generally preferable for the reason that they react more easily with carbon bisulphide and an alkali to form dithiocarbamates; but it is to be understood that in some cases secondary amines such as dibenzyl amine, methyl aniline and the like, and primary amines capable of forming dithiocarbamates may be employed instead.

Illustrative of salts of dithiocarbamates which may be employed in the invention are potassium dimethyl dithiocarbamate, sodium diethyl dithiocarbamate, sodium pentamethylene dithiocarbamate, ammonium ethyl methyl dithiocarbamate, sodium dibenzyl dithiocarbamate, potassium dibutyl dithiocarbamate, potassium di (beta phenyl ethylene) dithiocarbamate, zinc phenyl ethyl dithiocarbamate, sodium n-butyl dithiocarbamate and sodium isobutyl dithiocarbamate. Others are sodium methyl phenyl dithiocarbamate, sodium methyl tolyl dithiocarbamate, sodium isoamyl dithiocarbamate, sodium diamyl dithiocarbamate, sodium benzyl dithiocarbamate, sodium beta phenethyl dithiocarbamate and sodium cyclohexyl dithiocarbamate. Still others are the secondary alicyclic and furfuryl dithiocarbamates such as the dithiocarbamates derived from N-ethyl cyclohexyl amine, di cyclohexyl amine, cyclohexyl aniline, N-methyl hexahydro toluidine, N-ethyl decahydro naphthylamine, N-methyl aryl tetrahydro naphthylamine, di furfuryl amine, di tetra hydro alpha furfuryl amine, N-cyclo hexyl tetra hydro alpha furfuryl amine and N-ethyl tetra hydro alpha furfuryl amine.

The 1-halogen aryl thiazoles, exemplified herein by 1-chlor benzothiazole, may conveniently be prepared by dissolving 200 parts of crude mercaptobenzothiazole in 400 parts of a suitable solvent, preferably pentachlorethane in the case of 1-chlor benzothiazole itself, and then bubbling the desired halogen through the solution for a period of several hours while the solution is heated in a reflux condenser. In the case of 1-chlor benzothiazole, chlorine is of course employed, the chlorination continuing preferably from 5 to 7 hours. The period during which the halogen is bubbled through the solution may be shortened or increased somewhat at the will of the operator, longer periods resulting in more complete reaction. The reaction product is then distilled in order to separate the desired fraction from the remainder. In the case of 1-chlor benzothiazole, the fraction boiling at temperatures of from 240° C. to 252° C. represents the major portion of the reaction product of chlorine and mercaptobenzothiazole.

The 1-halogen benzothiazoles prepared by the preceding method may be caused to react with any of the dithiocarbamates previously described to produce excellent accelerators for rubber compounds. Although it is not known to be true in all cases, it is believed that the reaction proceeds according to the following general equation:

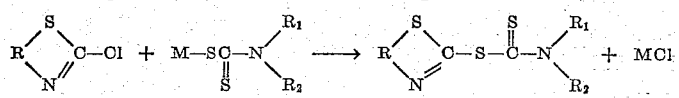

It will of course be understood that the structural formula of the resulting product is not known with certainty.

The reaction product of 1-chlor benzothiazole and the sodium salt of diethyl dithiocarbamate is an example of a compound falling within the scope of the invention. It may be prepared by dissolving 133 grams of 1-chlor benzothiazole and 120 grams of sodium diethyl dithiocarbamate in 500 cc. of ethyl alcohol and refluxing the solution for a period of six hours. The alcohol is then distilled off, preferably under reduced pressure, and the reaction product, remaining in the form of a residual oil, is washed with water. The material may then be dried with anhydrous calcium chloride (CaCl₂) and filtered. The product when distilled at a pressure of 5 mm. of mercury yields a light colored oil which is a non-accelerator and a resinous residue which is an accelerator.

The above procedure may be carried out with even better results with the nitro substituted chlor thiazoles; for example, 1-chlor 5-nitro benzothiazole. The latter substance may be caused to react with diethyl dithiocarbamate by dissolving 35 grams of 1-chlor 5-nitro benzothiazole in alcohol, heating the solution to boiling and adding 30 grams of sodium diethyl dithiocarbamate. After the solution has boiled for a period of from 5 to 10 minutes, it solidifies as a yellow mass. The vessel containing the mass is exposed to the heat of a small flame for a period of an hour and is then cooled. The reaction product precipitates as a crystalline material which should be washed with water to remove any sodium chloride formed during the reaction. The crystalline material may be further purified by recrystallizing it from boiling alcohol, from which it separates in the form of yellow plates having a melting point of from 120 to 122° C. The equation representing the reaction is probably as follows:

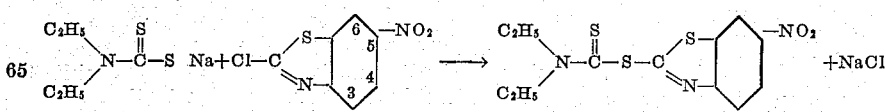

The invention also includes the reaction products of 1-halogen thiazoles with various other dithiocarbamates. Specific examples of these materials are the reaction products of 1-chlor benzothiazole with the alkali metal salt of pentamethylene dithiocarbamate (a semi-solid oily substance); the reaction product of 1-chlor benzothiazole with sodium dibenzyl dithiocarbamate (a dark oily material); the reaction product of sodium pentamethylene dithiocarbamate with 1-chlor 5-nitro benzothiazole (a crystalline substance having a melting point of 151—155° C.); and the reaction product of sodium dibenzyl dithiocarbamate with 1-chlor 5-nitro benzothiazole (a light yellow solid having a melting point of 141—142° C.).

Other thiazyl esters of the dithiocarbamates typical of the compounds to which the invention relates are 1-dimethyl dithiocarbamyl 5-nitro benzothiazole, melting at 203-204° C.; 1-dibutyl dithiocarbamyl 5-nitro benzothiazole (a red thick oil); 1-cyclohexyl dithiocarbamyl 5-nitro benzothiazole, and 1-N-butyl dithiocarbamyl 5-nitro benzothiazole. Still others are 1-N-ethyl cyclohexyl dithiocarbamyl 5-nitro benzothiazole (a yellow compound melting at 146-147° C.); 1-dicyclohexyl dithiocarbamyl 5-nitro benzothiazole (a yellow compound melting at 188-189° C.); 1-dialpha furfuryl dithiocarbamyl 5-nitro benzothiazole (a brown compound melting at 93-95° C.) and 1-di tetrahydro alpha furfuryl dithiocarbamyl 5-nitro benzothiazole (a cream-colored compound melting at 116-118° C.).

By the practice of the invention, it is believed that any thiazyl ester of an N-substituted dithiocarbamic acid may be prepared without regard to particular substituents or to the position thereof in the compound. However, the halogen nitro benzothiazoles have been found to be capable of being prepared somewhat more easily than certain of the other thiazoles, the presence of the nitro group apparently facilitating the reaction. It will be understood that the bromo and other halogen benzothiazoles may be substituted for the chlor benzothiazoles.

This application is in part a continuation of application Serial No. 420,011 filed January 10, 1930, which is a division of application Serial No. 239,266 filed December 10, 1927, now matured into Patent No. 1,757,930. It is intended that the patent maturing from this application shall cover by suitable expression in the appended claims whatever features of patentable novelty reside in the invention.

What I claim is:

1. 1-(diethyl dithiocarbamyl) 5-nitro benzothiazole.

2. 1-(penta methylene dithiocarbamyl) 5-nitro benzothiazole.

3. A compound having the formula

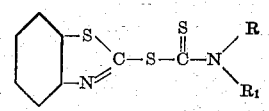

in which both R and R₁ are alkyl or benzyl radicals or R and R₁ together form a pentamethylene chain.

4. A 1-(diethyl dithiocarbamyl) benzothiazole.

5. A 1-(penta methylene dithiocarbamyl) benzothiazole.

6. A 1-(dibenzyl dithiocarbamyl) benzothiazole.

7. A material having the formula

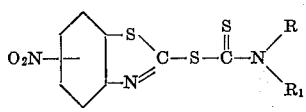

in which R and R₁ are radicals selected from a group consisting of the alkyl and phenalkyl hydrocarbons.

8. A 1-benzothiazyl ester of a hydrocarbon substituted dithiocarbamic acid.

9. A nitro 1-benzothiazyl ester of a dihydrocarbon substituted dithiocarbamic acid.

10. The compound having the formula

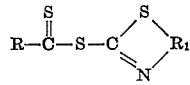

in which R represents a piperidyl radical and R₁ represents a nitro substituted arylene group of the benzene and naphthalene series.

11. The compound having the formula

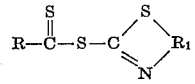

in which R represents a piperidyl radical and R₁ represents a nitro substituted benzene group.

12. A compound having the formula

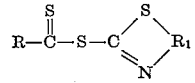

in which R represents a hydrocarbon substituted amino group and R¹ represents an arylene group of the benzene and naphthalene series.

13. A compound having the formula

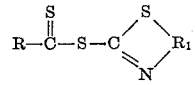

in which R represents a dihydrocarbon substituted amino group and R₁ represents a nitro phenylene group.

14. A compound having the formula

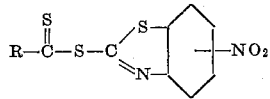

in which R represents a tertiary amino group.

15. A method of preparing 1-(diethyl dithiocarbamyl) 5-nitro benzothiazole which comprises reacting 1-chlor 5-nitro benzothiazole with a soluble salt of diethyl dithiocarbamic acid.

16. A method of preparing 1-(penta-methylene dithiocarbamyl) 5-nitro benzothiazole which comprises reacting 1-chlor 5-nitro benzothiazole with a soluble salt of pentamethylene dithiocarbamic acid.

17. A compound having the formula

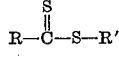

wherein R is the radical of a secondary amino group and R' is a 1-arylene thiazyl radical of the benzene and naphthalene series.

18. The arylene thiazole derivatives which are the reaction products of 1-halogen arylene thiazoles of the benzene and naphthalene series and soluble salts of dithiocarbamic acids of the formula

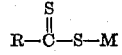

wherein M is a soluble salt-forming radical and R is a radical selected from the group consisting of radicals of primary amino groups and radicals of secondary amino groups.

19. The compounds having the formula

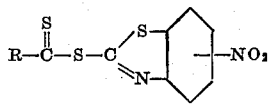

in which R is a radical selected from the group consisting of radicals of primary amino groups and radicals of secondary amino groups.

20. The method of preparing compounds having the formula

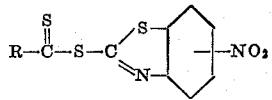

in which R is a radical selected from the group consisting of radicals of primary amino groups and radicals of secondary amino groups which comprises reacting in solution 1-chlor nitro benzothiazole with a dithiocarbamate having the formula

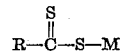

wherein M is an alkali metal and R is a radical defined as aforesaid.

21. The method of preparing arylene thiazyl derivatives which comprises reacting in solution a 1-halogen arylene thiazole with a soluble salt of a dithiocarbamic acid of the formula

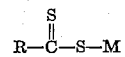

wherein M is a soluble salt-forming radical and R is a radical selected from the group consisting of radicals of primary amino groups and radicals of secondary amino groups, said arylene radical being a member of the benzene and naphthalene series.

22. 1-arylene thiazyl esters of dithiocarbamic acids, said arylene radical being a member of the benzene and naphthalene series and said dithiocarbamic acid portion of the compounds having the formula

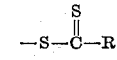

wherein R is a radical selected from the group consisting of radicals of primary amino groups and radicals of secondary amino groups.

JAN TEPPEMA.